(12) United States Patent
Ahmad et al.

(10) Patent No.: US 12,050,521 B2
(45) Date of Patent: Jul. 30, 2024

(54) MANAGEMENT METHOD

(71) Applicant: Hitachi, Ltd., Tokyo (JP)

(72) Inventors: Avais Ahmad, Tokyo (JP); Shinichi Hayashi, Tokyo (JP); Kaori Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 8 days.

(21) Appl. No.: 18/178,970

(22) Filed: Mar. 6, 2023

(65) Prior Publication Data

US 2024/0103983 A1 Mar. 28, 2024

(30) Foreign Application Priority Data

Sep. 22, 2022 (JP) ................................ 2022-151812

(51) Int. Cl.
*G06F 11/14* (2006.01)
(52) U.S. Cl.
CPC ...... *G06F 11/1464* (2013.01); *G06F 11/1461* (2013.01)

(58) Field of Classification Search
CPC .................. G06F 11/1464; G06F 11/1461
See application file for complete search history.

(56) References Cited

U.S. PATENT DOCUMENTS 8,429,140 B1 4/2013 Lolayekar et al.
2018/0150229 A1* 5/2018 Brown .................... G06F 3/065

* cited by examiner

*Primary Examiner* — Nadeem Iqbal
(74) *Attorney, Agent, or Firm* — Volpe Koenig

(57) ABSTRACT

A management method includes accessing API interfaces and collecting data related to primary volumes, remote copy volumes, and shared upload volumes, generating order topology related to the primary, remote copy, and shared upload volumes, calculating a set P of the primary volumes storing data to be deleted and specifying a set Vd of the remote copy volumes directly related to the set P in the order topology, calculating, as a set C, all of the shared upload volumes related to the set P in the order topology and specifying a set Vi of all of the remote copy volumes related to the set C in the order topology, calculating a set Vid as the complementary set of the set Vd in the set Vi, and specifying a set Pid of the primary volumes one level higher than the set Vid in the order topology.

3 Claims, 18 Drawing Sheets

FIG. 8

SERVER MEMORY 8100

TOPOLOGY LINK T1200

| LINK ID T1210 | TRANSMISSION SOURCE T1220 | TRANSMISSION DESTINATION T1230 |
|---|---|---|
| L500 | N400 | N450 |
| L501 | N401 | N451 |
| L502 | N450 | N300 |
| L503 | N451 | N301 |
| L504 | N301 | N302 |
| L505 | N302 | N303 |
| L506 | N300 | N600 |
| L507 | N301 | N601 |
| L508 | N600 | N602 |
| L509 | N601 | N603 |
| L510 | N602 | N700 |
| L511 | N603 | N700 |
| L512 | N602 | N606 |
| L513 | N603 | N607 |
| L514 | N700 | N604 |
| L515 | N604 | N605 |
| L516 | N605 | N606 |
| L517 | N605 | N607 |
| L518 | N606 | N608 |
| L519 | N606 | N609 |
| L520 | N607 | N610 |
| L523 | N603 | N067 |

FIG. 10

SERVER MEMORY 8100

VOLUME LIST T1700

| VOLUME ID (T1710) | RESOURCE IDENTIFIER (T1720) | LABEL (T1730) | TYPE (T1740) |
|---|---|---|---|
| 600 | 0 | P1 | PRIMARY VOLUME |
| 601 | 1 | P2 | PRIMARY VOLUME |
| 602 | 2 | S1 | SECONDARY VOLUME |
| 603 | 3 | S2 | SECONDARY VOLUME |
| 604 | Xyx/abc | C3 | CACHE |
| 605 | Xyx/de | B1 | SHARED UPLOAD VOLUME |
| 606 | Xyx/fg | R1 | REMOTE COPY VOLUME |
| 607 | Xyx/hi | R2 | REMOTE COPY VOLUME |
| 608 | Xyx/jk | Sn1 | SNAPSHOT |
| 609 | Xyx/lm | Sn2 | SNAPSHOT |
| 610 | Xyx/no | Sn3 | SNAPSHOT |
| : | : | : | : |

MANAGEMENT METHOD

BACKGROUND OF THE INVENTION

Field of the Invention

The present invention relates to a management method.

Description of the Related Art

Data backup is used to avoid a data loss due to hardware failure or the like. U.S. Pat. No. 8,429,140 discloses a configuration in which an agent is installed on a server to find the relation between the server and a storage. In U.S. Pat. No. 8,429,140, an application object manager engine that is an agent on a host server determines mapping between a database application and a storage object in a storage system, in other words, a logical volume. The mapping is used for policy management.

SUMMARY OF THE INVENTION

The invention disclosed in U.S. Pat. No. 8,429,140 does not consider cloud backup and cannot indicate impact of a data deletion operation for policy compliance on volume backup.

According to the 1st aspect of the present invention, a management method executed by a computer to manage a relation among primary volumes, remote copy volumes, and shared upload volumes, the management method includes: a topology specification step of accessing API interfaces and collecting data related to the primary volumes, the remote copy volumes, and the shared upload volumes, a topology generation step of generating order topology related to the primary volumes, the remote copy volumes, and the shared upload volumes, a first specification step of calculating a set P of the primary volumes storing data to be deleted and specifying a set Vd of the remote copy volumes directly related to the set P in the order topology, a second specification step of calculating, as a set C, all of the shared upload volumes related to the set P in the order topology and specifying a set Vi of all of the remote copy volumes related to the set C in the order topology, a third specification step of calculating a set Vid as the complementary set of the set Vd in the set Vi, and a fourth specification step of specifying a set Pid of the primary volumes one level higher than the set Vid in the order topology.

According to the present invention, it is possible to specify impact of data deletion in advance.

BRIEF DESCRIPTION OF THE DRAWINGS

FIG. 8 is a diagram illustrating data stored in the server memory;

FIG. 10 is a diagram illustrating data stored in the server memory;

DETAILED DESCRIPTION OF THE PREFERRED EMBODIMENTS

First Embodiment

A proposed method to be described below estimates impact of data deletion operation on volume backup. The present method is a novel method and targeted for all replication environments that use a mechanism such as a cache for copying. In a typical remote storage system, latency occurs when a large amount of data is copied, and thus a copying operation is often executed out of synchronization. A shared volume for holding data until the data is finally uploaded is used to execute this asynchronous copying. Such a mechanism is used on both a public cloud and a private cloud. This shared upload volume is also referred to as an upload buffer, a journal, a cache, or the like in accordance with an environment.

When a user of the system wants to delete data, such shared upload volumes all need to be traced and deleted. This deleting operation affects backup of any other volume using the shared upload volumes in some cases. Such impact is unfavorable and needs to be avoided because extremely important data is potentially stored in the volume. In the present embodiment, impact of deletion can be presented before the deletion, and thus the user can determine importance of data and plan a data deletion method to reduce impact on backup.

A first embodiment of a management method executed by a management system will be described below with reference to FIGS. 1 to 15. The management system with the same configuration is applicable to both cloud storage gateway backup and universal replicator backup.

Figure 1:
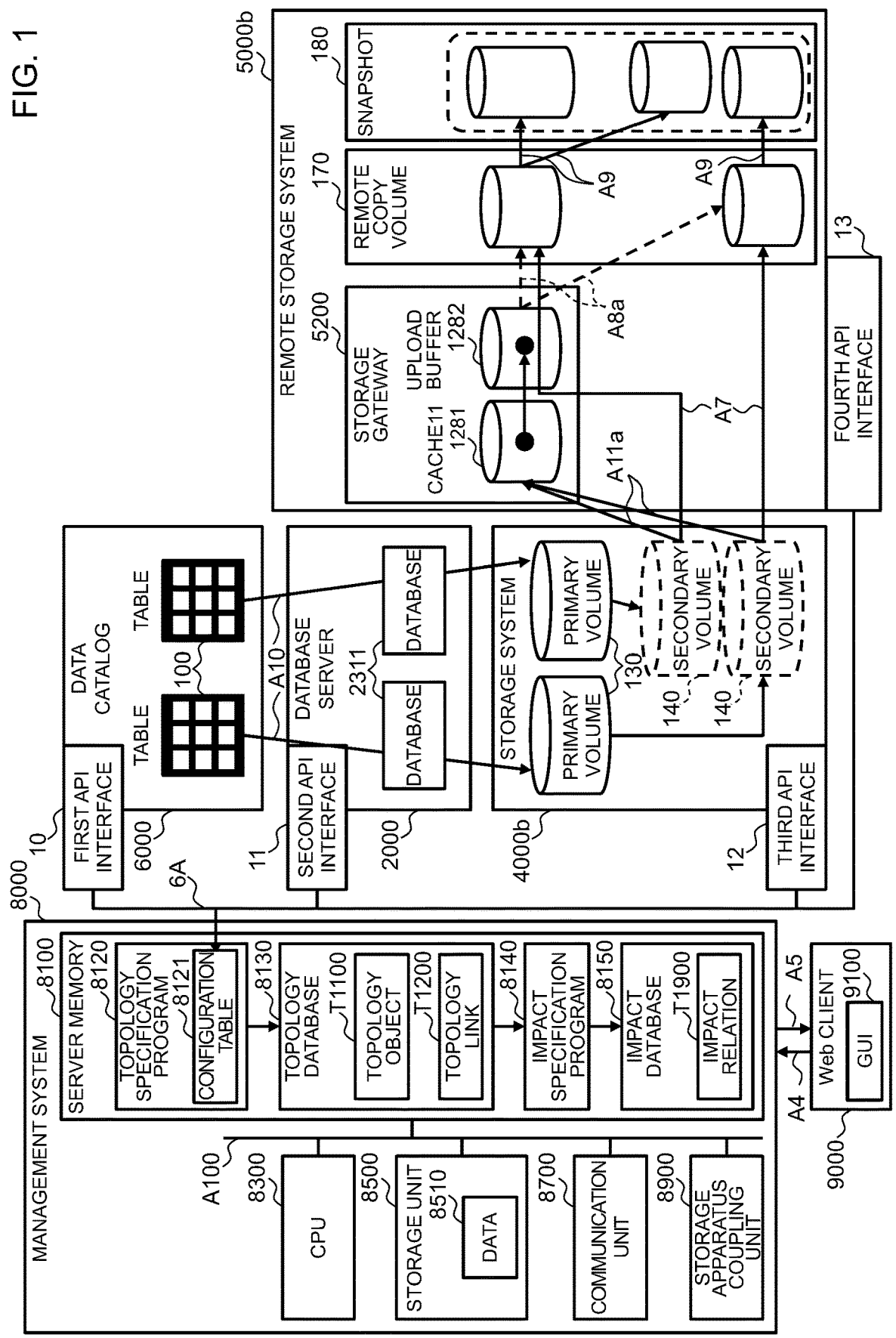
FIG. 1 is a block diagram of a management system using cloud storage gateway backup.
Figure 2:
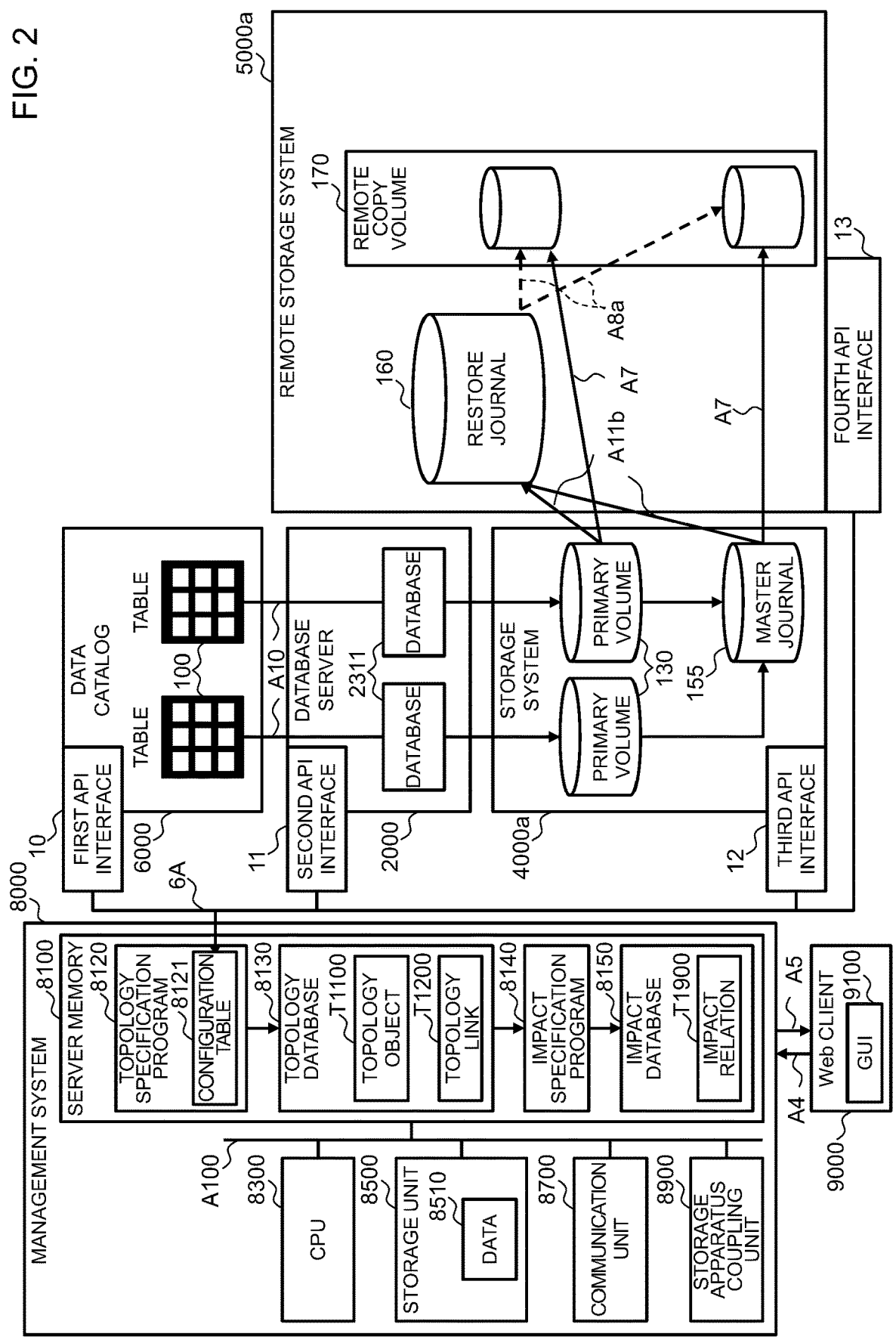
FIG. 2 is a block diagram of a management system using universal replicator backup.

FIG. 1 is a block diagram of a management system 8000 using cloud storage gateway backup. FIG. 2 is a block diagram of the management system 8000 using universal replicator backup. Between the two drawings, the configuration of the management system 8000 is the same, but components coupled to the management system 8000 are slightly different. The two drawings have a number of features in common and thus will be collectively described.

The management system 8000 includes a central processing unit, in other words, a CPU 8300 configured to load a computer program stored in a non-illustrated ROM onto a server memory 8100 and execute the computer program. The management system 8000 includes a communication bus A100. A communication unit 8700 is, for example, a network interface card and enables communication with other apparatuses. A storage apparatus coupling unit 8900 enables sharing of data 8510 stored in a storage unit 8500 through a network. The server memory 8100 stores a topology specification program 8120, a topology database 8130, an impact specification program 8140, and an impact database 8150. The topology specification program 8120 includes a configuration table 8121, and the topology database 8130 includes a topology object T1100 and a topology link T1200. The impact database 8150 includes an impact relation T1900.

As indicated by reference sign 6A, the topology specification program 8120 acquires data from each of a data catalog 6000, a database server 2000, a storage system 4000a or 4000b, and a remote storage system 5000a or 5000b through the corresponding API interface and records the data as the configuration table 8121. Specifically, data is acquired from the data catalog 6000 through a first API interface 10, from the database server 2000 through a second API interface 11, from the storage system 4000a or 4000b through a third API interface 12, and from the remote storage system 5000a or 5000b through a fourth API interface 13.

In the following description, the first API interface 10, the second API interface 11, the third API interface 12, and the fourth API interface 13 are also collectively referred to as API interfaces 10A. Each API interface 10A is a software mediator and allows software components to exchange information and share data by response. Each API interface 10A in the present embodiment can provide various kinds of data to be described later. By using the API interfaces 10A, the topology specification program 8120 acquires data of a storage gateway list T1300, a data catalog list T1400, a database list T1500, a table list T1600, a volume list T1700, and an iSCSI/FC mapping list T1800. The data catalog list T1400 may be provided by a user.

The data catalog 6000 is a software program and functions as an index for all acquirable information. The data catalog 6000 includes a metadata assembly and data management and search tools. The topology specification program 8120 generates the topology database 8130 based on the configuration table 8121 that is a collected data assembly. The topology database 8130 is input to the impact specification program 8140.

The impact specification program 8140 calculates the impact relation T1900 through operation illustrated in a flowchart of FIG. 15 to be described later. As indicated by reference sign A4, the user inputs, by using a graphical user interface (GUI) 9100, a table to be deleted by using a Web client 9000. The impact specification program 8140 operates based on the input, and the impact relation T1900 that is a result of the calculation is transmitted to the Web client 9000 as indicated by reference sign A5 and is provided to the user through the GUI 9100.

Reference sign 100 denotes table metadata of a database 2311 existing on a primary volume 130. This data flow is denoted by reference sign A10. As indicated by reference sign A11, the primary volume 130 is copied or backed up as a remote copy volume 170 to the remote storage system 5000a or 5000b.

In the public cloud case illustrated in FIG. 1, copy and backup of the primary volume 130 are indicated as copy or backup on a virtual secondary volume 140. A storage gateway 5200 first copies the secondary volume 140 to a cache 1281 and an upload buffer 1282 as indicated by reference sign A11a and then copies the volume to the remote copy volume 170 as indicated by reference sign A8a. A snapshot of the remote copy volume 170 is stored in a snapshot 180 as indicated by reference sign A9.

In the universal replicator case illustrated in FIG. 2, copy and backup of the primary volume 130 are first copied to a master journal 155 as indicated by reference sign A6. Subsequently, the master journal 155 is copied to a restore journal 160 as illustrated with an arrow A11b. Then, the restore journal 160 is copied to the remote copy volume 170 as illustrated with an arrow A8b.

Figure 3:
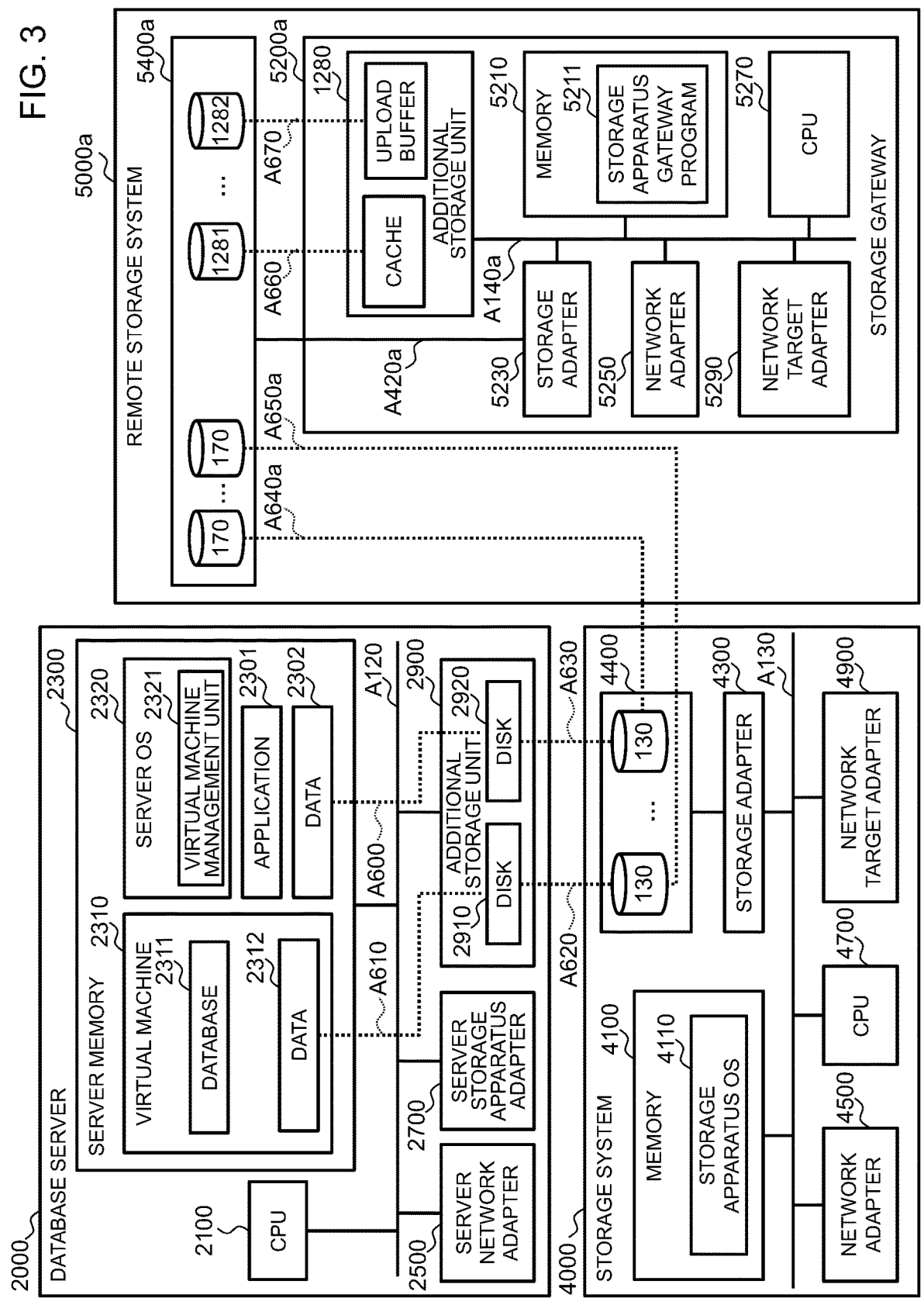
FIG. 3 is a configuration diagram of a database server system, a storage system, and a remote storage apparatus system that use cloud storage gateway backup.
Figure 4:
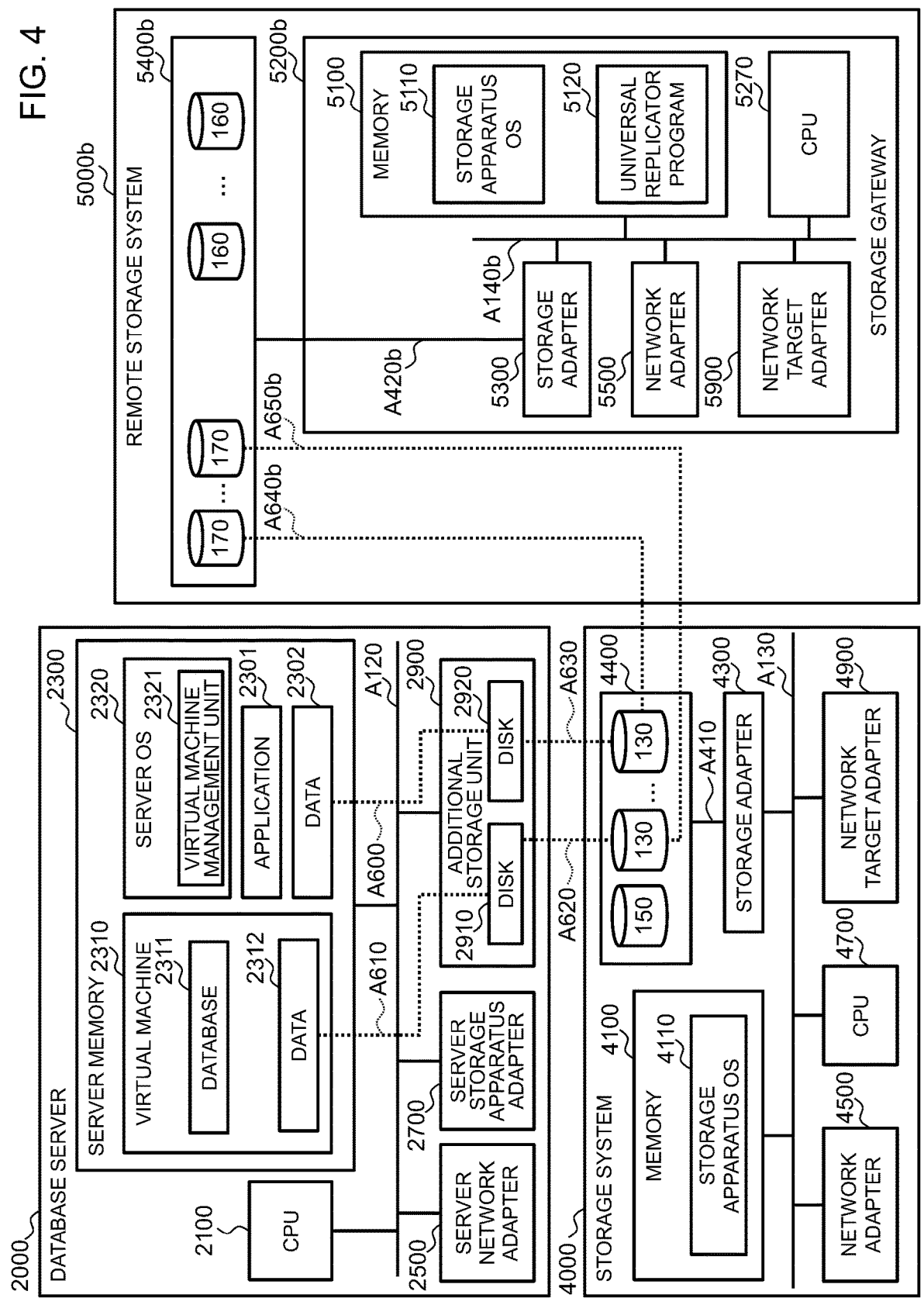
FIG. 4 is a configuration diagram of a database server system, a storage system, and a remote storage system that use universal replicator backup.
Figure 5:
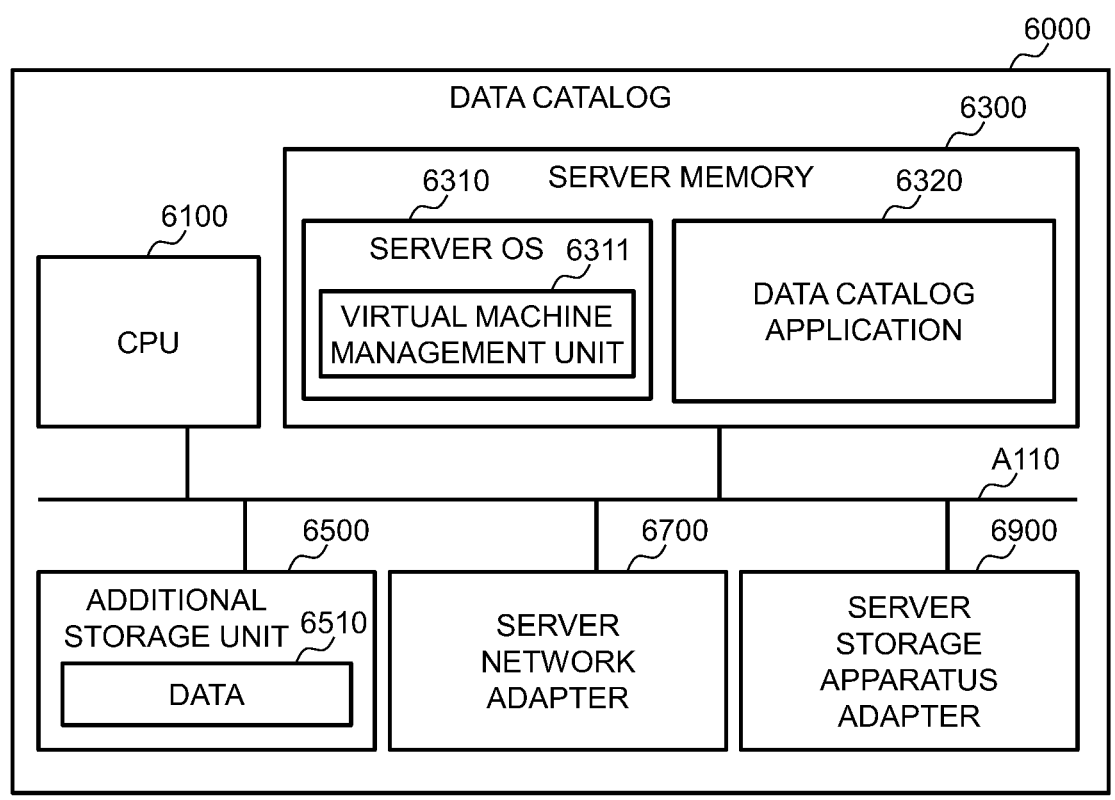
FIG. 5 is a configuration diagram of a data catalog system that is common to cloud storage gateway backup and universal replicator backup.

FIG. 3 is a configuration diagram of the database server 2000, a storage system 4000, and the remote storage system 5000a using cloud storage gateway backup. FIG. 4 is a configuration diagram of the database server 2000, the storage system 4000, and the remote storage system 5000b using universal replicator backup. FIG. 5 is a configuration diagram of the data catalog 6000 that is common to cloud storage gateway backup and universal replicator backup.

The data catalog 6000 illustrated in FIG. 5 includes a CPU 6100, a server memory 6300, an additional storage unit 6500, a server network adapter 6700, a server storage apparatus adapter 6900, and a communication bus A110 coupling the components of the data catalog 6000. The CPU 6100 processes a computer program executed in the data catalog 6000. The server network adapter 6700 handles communication between the data catalog 6000 and another apparatus.

The server storage apparatus adapter 6900 allows the additional storage unit 6500 to be available on a network, the additional storage unit 6500 storing data 6510. The server memory 6300 stores a computer program executed on the data catalog 6000. Typical computer programs stored in the server memory 6300 are a server OS 6310 and a data catalog application 6320. The data catalog application 6320 may operate on any virtual machine managed by a virtual machine management unit 6311 or may operate on a bare-metal server.

The database server 2000 illustrated in FIGS. 3 and 4 includes a CPU 2100, a server memory 2300, a server network adapter 2500, a server storage apparatus adapter 2700, an additional storage unit 2900, and a communication bus A120 coupling the components of the database server 2000. The CPU 2100 processes a computer program executed in the database server 2000. The server network adapter 2500 handles communication between the database server 2000 and another apparatus. The server storage apparatus adapter 2700 allows the additional storage unit 2900 to be available on a network, the additional storage unit 2900 including a disk 2910 and a disk 2920.

The server memory 2300 stores a computer program executed on the database server 2000. A server OS 2320 may operate on any virtual machine executed by a virtual machine management unit 2321 or may operate on a bare-metal server. A virtual machine 2310 performs reading and update of the database 2311. Data 2312 and data 2302 are stored in the disk 2910 or the disk 2920 of the additional storage unit 2900. Reference signs A600 and A610 denote data flow between the server memory 2300 and the additional storage unit 2900.

The storage system 4000 includes a memory 4100, a storage adapter 4300, a disk array 4400, a network adapter 4500, a CPU 4700, a network target adapter 4900, and a communication bus A130 coupling the components of the storage system 4000. The CPU 4700 processes a computer program executed in the storage system 4000. The network adapter 4500 handles communication between the storage system 4000 and another apparatus. The network target adapter 4900 couples the disk array 4400 to another system through a network. The memory 4100 mainly stores a storage apparatus OS 4110. The disk array 4400 is coupled to the communication bus A130 through the storage adapter 4300. Reference signs A620 and A630 denote data flow between the database server 2000 and the storage system 4000.

The remote storage system 5000a illustrated in FIG. 3 is an example of a public cloud remote storage. The remote storage system 5000a includes a storage gateway 5200a and a volume array 5400a coupled through a storage adapter 5230. The coupling between the volume array 5400a and the storage adapter 5230 is denoted by reference sign A420a. The storage gateway 5200a includes a memory 5210, a CPU 5270, the storage adapter 5230, a network adapter 5250, a network target adapter 5290, an additional storage unit 1280, and a communication bus A140a coupling the components of the storage gateway 5200a.

The CPU 5270 processes a computer program executed on the storage gateway 5200a. The network adapter 5250 handles communication between the remote storage system 5000a and another apparatus. The network target adapter 5290 couples the additional storage unit 1280 to another system through a network. The memory 5210 mainly stores a storage apparatus gateway program 5211. The additional storage unit 1280 includes a cache volume, an upload buffer volume, a root volume, and any other related volume. Reference signs A640a and A650a denote data flow between the disk array 4400 of the storage system 4000 and the volume array 5400a. Reference signs A660 and A670 denote data flow between the volume array 5400a and each of the cache and upload buffer volumes stored in the additional storage unit 1280.

The remote storage system 5000b illustrated in FIG. 4 is an example of a remote storage using a universal replicator. The remote storage system 5000b includes a storage gateway 5200b and a volume array 5400b coupled through a storage adapter 5300. The coupling between the volume array 5400b and the storage adapter 5300 is denoted by reference sign A420b. The storage gateway 5200b includes a memory 5100, the CPU 5270, the storage adapter 5300, a network adapter 5500, a network target adapter 5900, and a communication bus A140b coupling the components of the storage gateway 5200b. The CPU 5270 processes a computer program executed on the remote storage system 5000b.

The network adapter 5500 handles communication between the remote storage system 5000b and another apparatus. The network target adapter 5900 couples a storage apparatus to another system through a network. The memory 5100 stores a storage apparatus OS 5110 and a universal replicator program 5120. The primary volume 130 is copied or backed up as the remote copy volume 170 in the remote storage system 5000a or 5000b. Reference signs A640b and A650b denote data flow between the disk array 4400 of the storage system 4000 and the volume array 5400b of the remote storage system 5000b.

Figure 6:
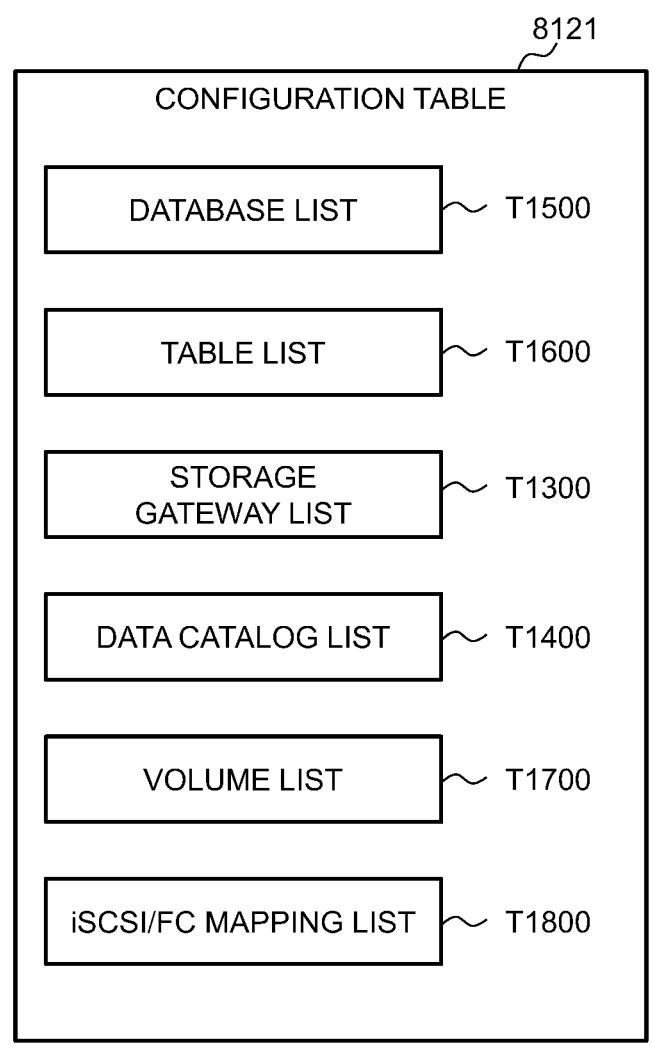
FIG. 6 is a diagram illustrating a list of data included in a setting table.

FIG. 6 is a list of data in the configuration table 8121 included in the topology specification program 8120. The topology specification program 8120 includes the storage gateway list T1300, the data catalog list T1400, the database list T1500, the table list T1600, the volume list T1700, and the iSCSI/FC mapping list T1800.

FIGS. 7 to 13 are diagrams illustrating data stored in the server memory 8100. Specifically, FIGS. 7 to 13 illustrate examples of the topology object T1100, the topology link T1200, the storage gateway list T1300, the data catalog list T1400, the database list T1500, the table list T1600, the volume list T1700, the iSCSI/FC mapping list T1800, and the impact relation T1900.

Figure 7:
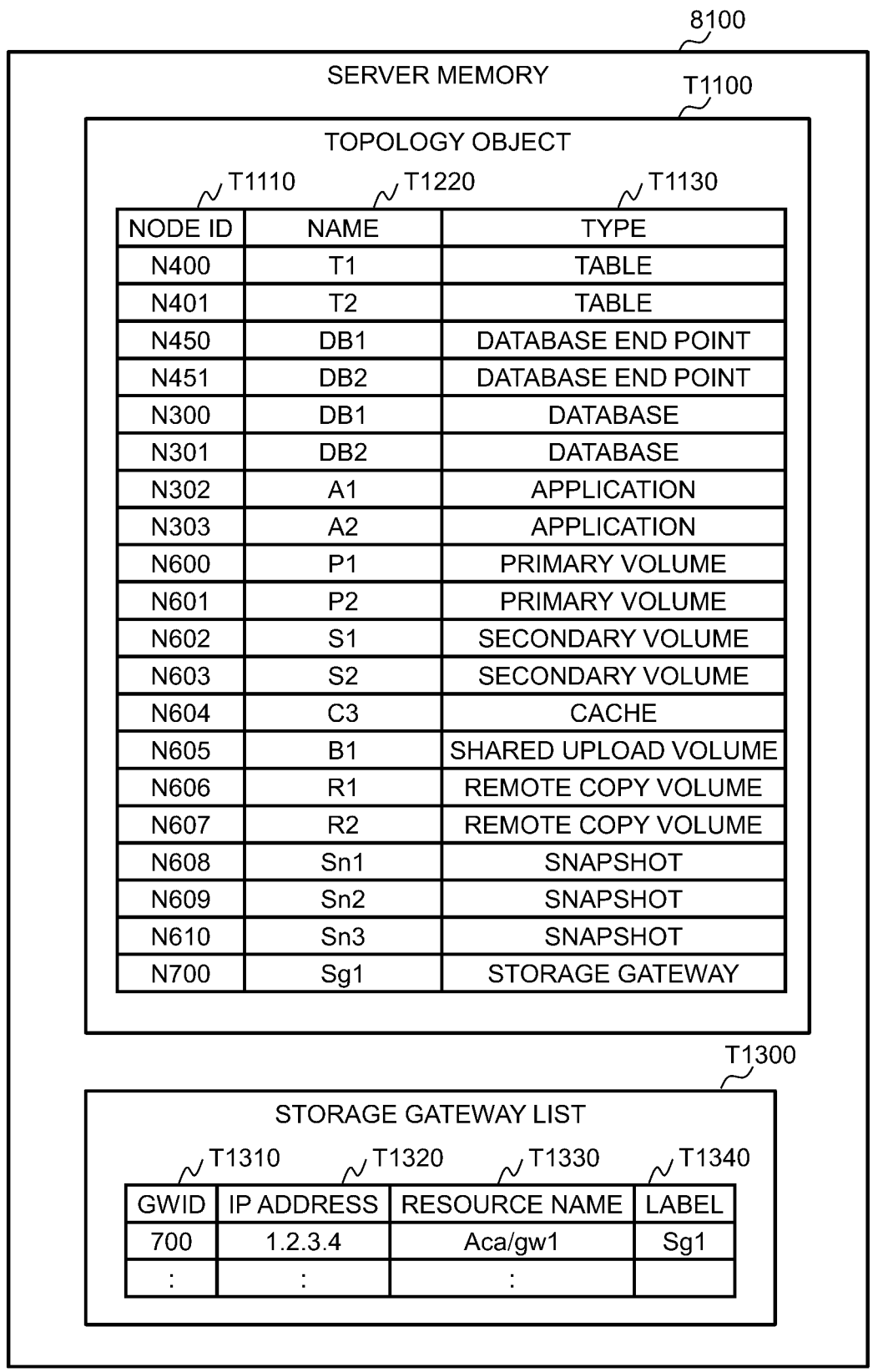
FIG. 7 is a diagram illustrating data stored in a server memory.

FIG. 7 is a diagram illustrating data stored in the server memory 8100 and illustrates examples of the topology object T1100 and the storage gateway list T1300. The topology object T1000 stores information of nodes constituting topology. Specifically, the topology object T1000 includes a node ID T1110, a name T1120, and a type T1130 of each node. The storage gateway list T1300 stores storage gateway information. This information is useful in an implementation in which storage gateway software is used for volume backup. Specifically, the storage gateway list T1300 includes a GWID T1310 that specifies a storage gateway, an IP address T1320 that is the IP address of the storage gateway, a resource name T1330 for uniquely identifying the storage gateway in a cloud environment, and a label T1340 that is a label allocated to the storage gateway.

FIG. 8 is a diagram illustrating data stored in the server memory 8100 and illustrates an example of the topology link T1200. The topology link T1200 stores information of links coupling nodes constituting topology. Specifically, the topology link T1200 includes a link ID T1210 that specifies a link, a transmission source T1220 that is the node ID of a transmission source node, and a transmission destination T1230 that is the node ID of a target node or a transmission destination node.

Figure 9:
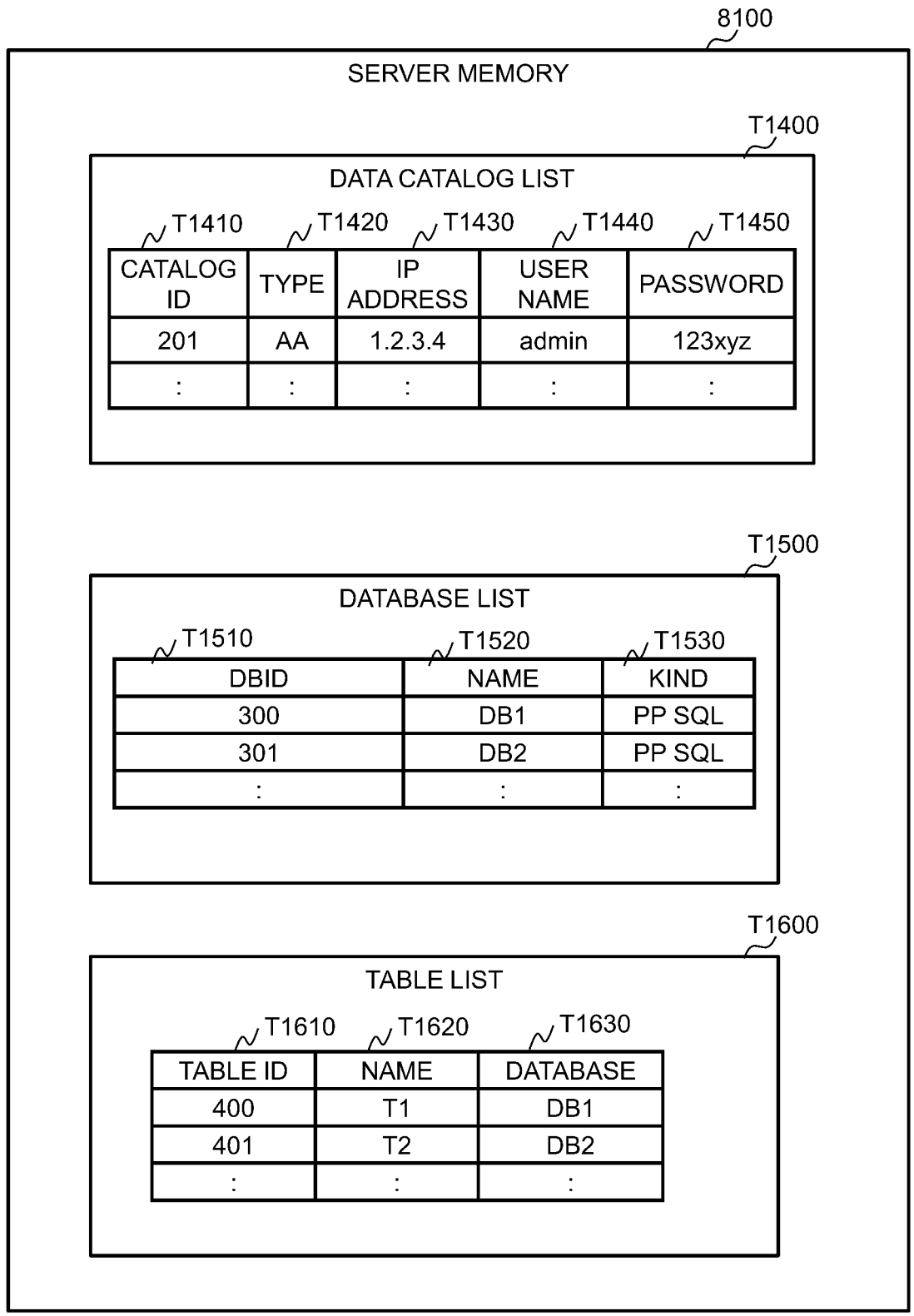
FIG. 9 is a diagram illustrating data stored in the server memory.

FIG. 9 is a diagram illustrating data stored in the server memory 8100 and illustrates examples of the data catalog list T1400, the database list T1500, and the table list T1600. The data catalog list T1400 stores information of data catalogs. Specifically, the data catalog list T1400 includes a catalog ID that is the identifier of a data catalog, a type T1420 that indicates the type of the data catalog, an IP address T1430 that is the IP address for access to the data catalog, a user name T1440 necessary for access to the data catalog, and a password T1450.

The database list T1500 stores information of databases. Specifically, the database list T1500 includes a DBID T1510 that is the identifier of a database, a name T1520 that is the name of the database, and a kind T1530 that indicates the kind of the database. The table list T1600 stores information of tables. Specifically, the table list T1600 includes a table ID T1610 that is the identifier of a table, a name T1620 that is the name of the table, and a database T1630 that is a database including the table.

FIG. 10 is a diagram illustrating data stored in the server memory 8100 and illustrates an example of the volume list T1700. The volume list T1700 stores information of volumes. Specifically, the volume list T1700 includes a volume ID T1710 that is the identifier of a volume, a resource identifier T1720 that is the logical device ID or unique resource name of the volume, a label T1730 that is a label of the volume, and a type T1740 that indicates the type of the volume. The type of a volume is, for example, main volume or cache volume.

Figure 11:
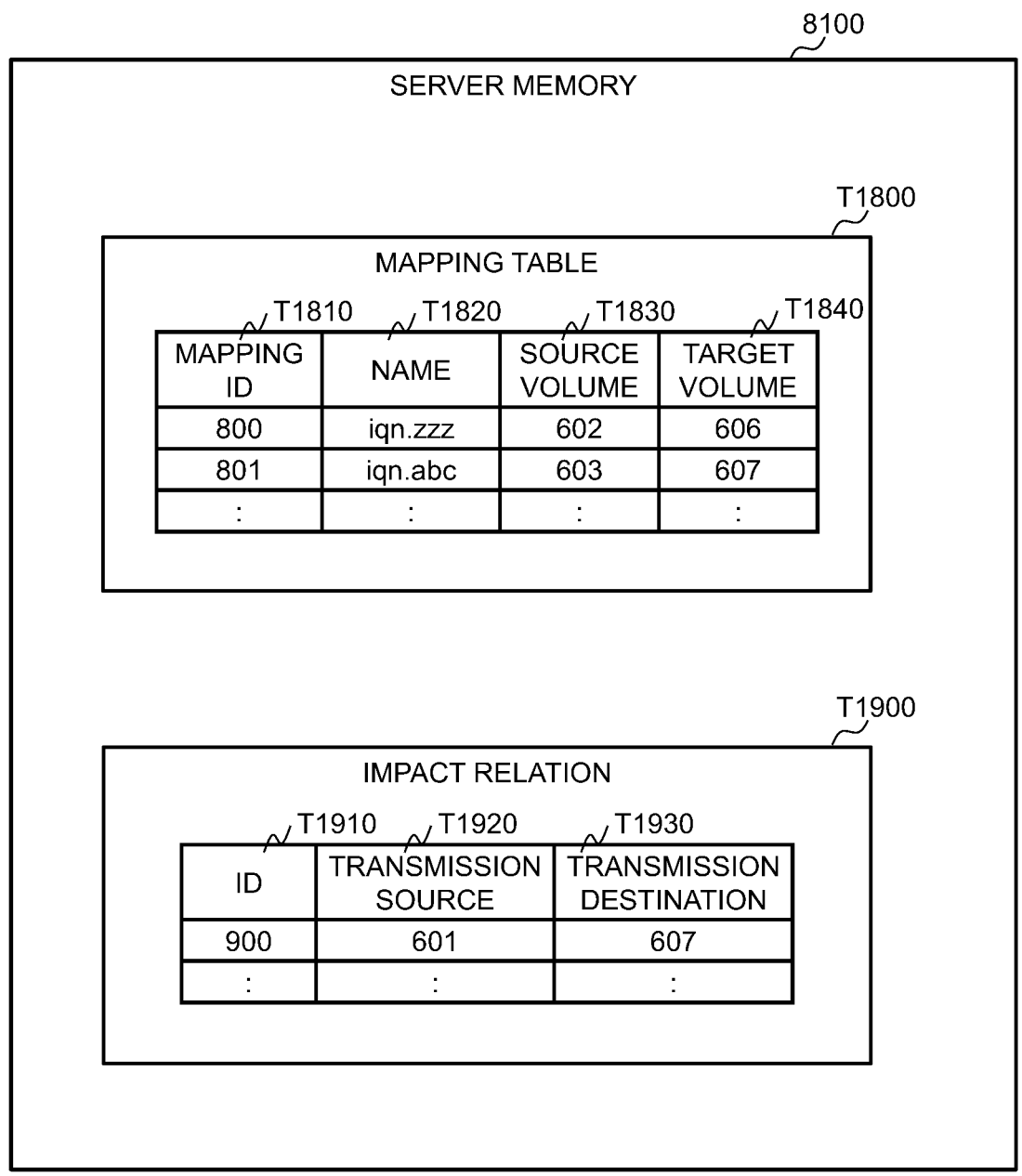
FIG. 11 is a diagram illustrating data stored in the server memory.

FIG. 11 is a diagram illustrating data stored in the server memory 8100 and illustrates examples of the iSCSI/FC mapping list T1800 and the impact relation T1900. The iSCSI/FC mapping list T1800 stores internet small computer systems interface (iSCSI) and fiber channel (FC) mapping information. Specifically, the iSCSI/FC mapping list T1800 includes a mapping ID T1810 that is the identifier of mapping, a name T1820 that is a name uniquely specifying an iSCSI or an FC, a source volume T1830 that is a mapped source volume ID, and a target volume T1840 that is a mapped target volume ID. The impact relation T1900 includes an ID T1910 that is the identifier of an impact relation, a transmission source T1920 that specifies a transmission source node, and a transmission destination T1930 that specifies a target or transmission destination node.

Figure 12:
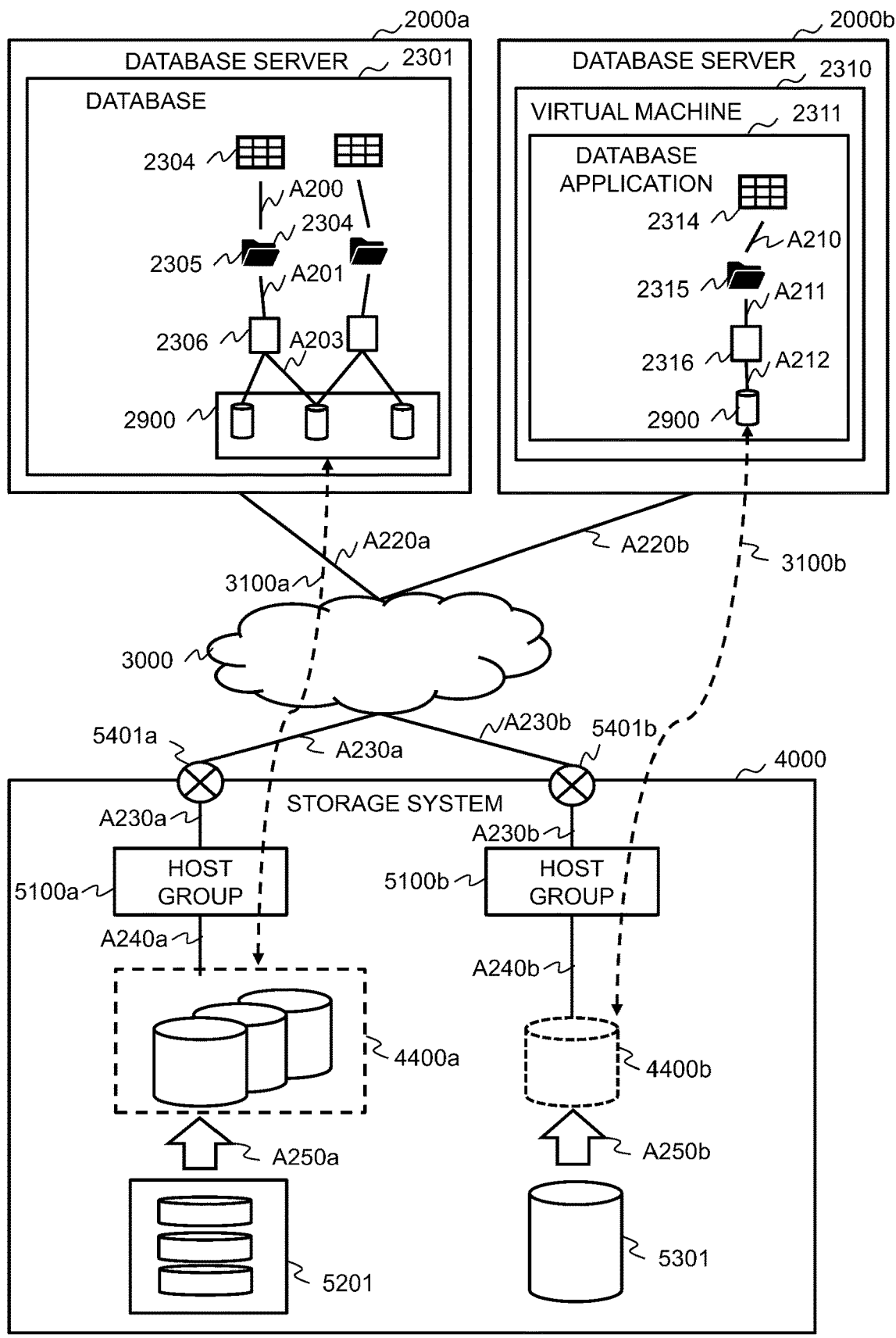
FIG. 12 is a diagram illustrating an example in which a server system is coupled to a storage.

FIG. 12 is a diagram illustrating an example in which a server system is coupled to a storage. A database server 2000a operates a database application 2301 on a bare-metal server. A database server 2000b operates, on a virtual machine 2310, an application that controls the database 2311. Data of a table 2304 is stored in a directory 2305 as indicated by reference sign A200. The directory 2305 exists in the additional storage unit 2900 as indicated by reference sign A201. The relation between the directory 2305 and the additional storage unit 2900 is managed by a LVM layer 2306 as indicated by reference signs A201 and A203. Data of a table 2314 is stored in a directory 2315 as indicated by reference sign A210. The directory 2315 exists in the additional storage unit 2900 as indicated by reference sign A211. The relation between the directory 2315 and the additional storage unit 2900 is managed by a LVM layer 2316 as indicated by reference signs A211 and A212.

The database servers 2000a and 2000b are coupled to the storage system 4000 through a storage area network 3000 as indicated by reference signs A220a, A220b, A230a, and A230b. Ports 5401a and 5401b each couple a server and a volume. The port 5401a is coupled to a host group 5100a as indicated by reference sign A230a. The host group 5100a is coupled to a volume 4400a that is an array of basic volumes obtained by dividing a disk array called a parity group 5201 as indicated by reference sign A240a. The port 5401b is coupled to a host group 5100b as indicated by reference sign A230b. The host group 5100b includes a virtual volume 4400b partitioned through a pool of a disk 5301 as indicated by reference sign A240b.

The volume 4400a is mapped to the additional storage unit 2900 mounted through a communication protocol 3100a such as iSCSI or FC as indicated by reference sign 3100a. The virtual volume 4400b is mapped to the additional storage unit 2900 mounted through a communication protocol 3100b such as iSCSI or FC as indicated by reference sign 3100b. The correspondence between a source volume and a target volume is managed by the iSCSI/FC mapping list T1800.

Figure 13:
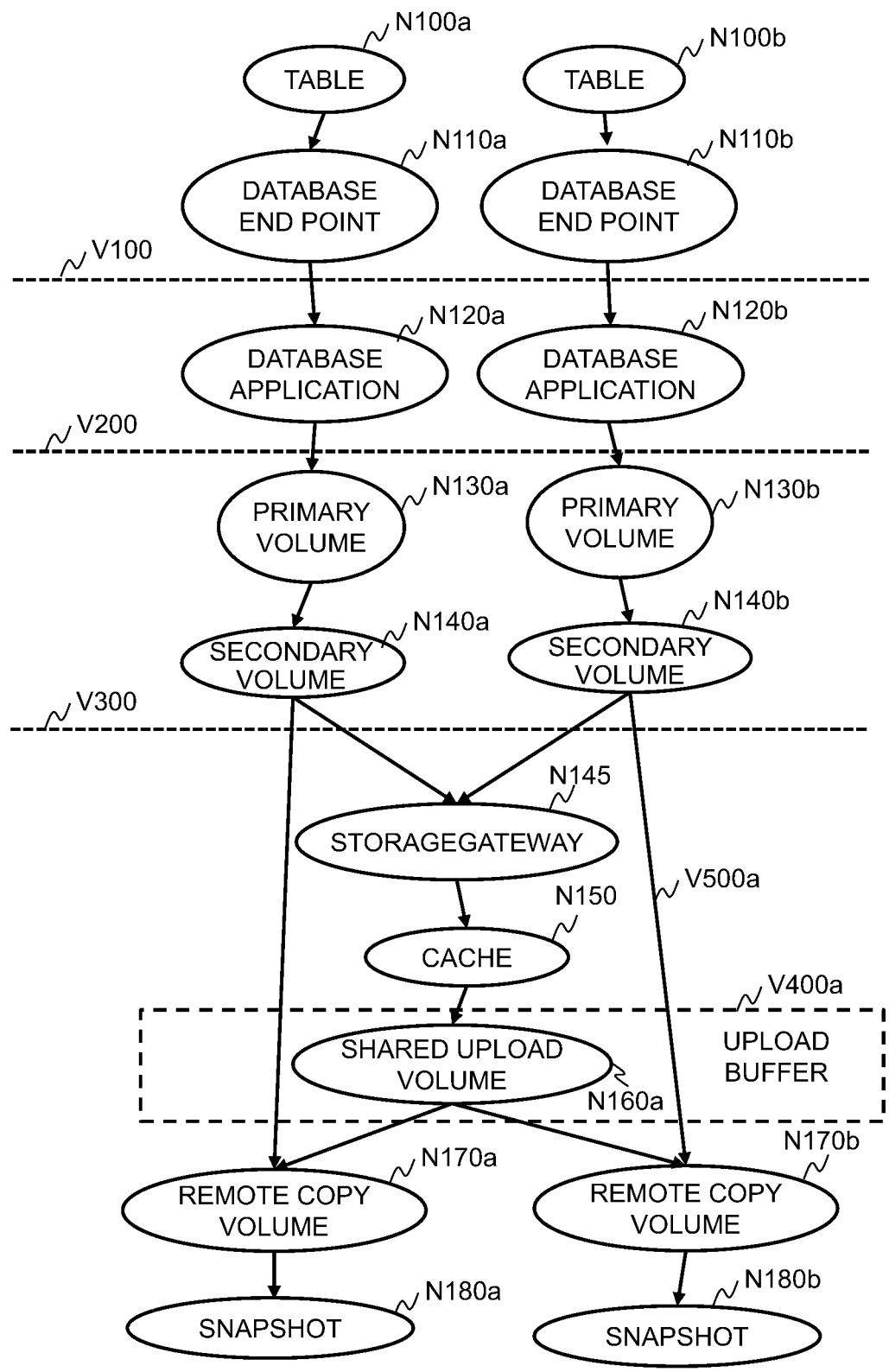
FIG. 13 is a typical topology graph when a public cloud is used as a remote storage environment.
Figure 14:
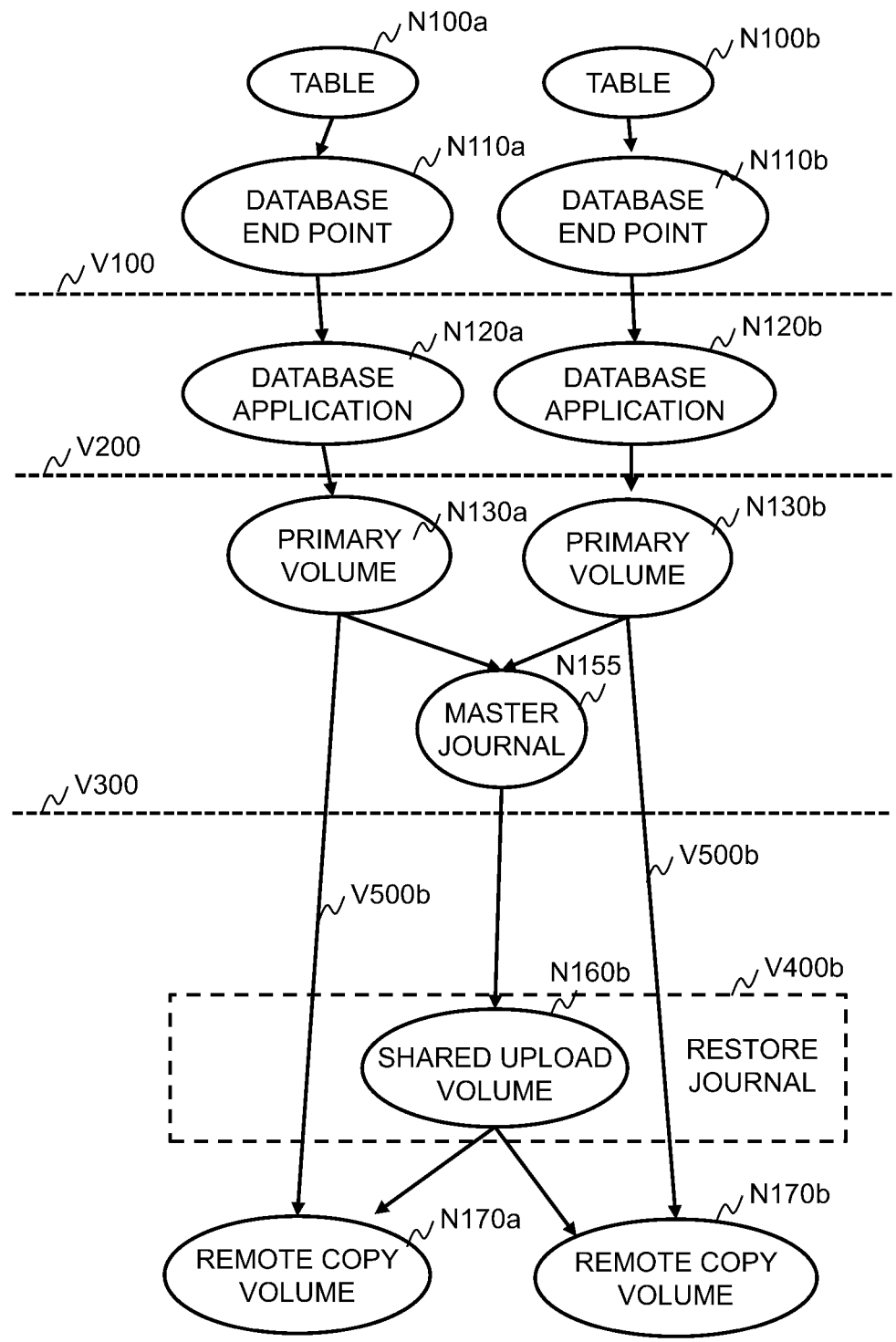
FIG. 14 is a typical topology graph when a universal replicator is used as a remote storage environment.

FIG. 13 is a typical topology graph when a public cloud is used as a remote storage environment, and FIG. 14 is a typical topology graph when a universal replicator is used as a remote storage environment. These order topologies are referred in processing illustrated in a flowchart to be described later.

Reference sign N100 denotes a table 100 derived from the data catalog 6000. Reference sign N110 denotes a database end point derived from the data catalog 6000 and including important information such as an IP address, a port number, and a database credential. Reference sign N120 denotes a database application that processes the database 2311 existing in a cluster, and includes the name and metadata of the database 2311. Reference sign N130 denotes a primary volume 130 mounted on the database 2311.

Reference sign N140 denotes a secondary volume 140 virtualized in the storage system. Reference sign N145 denotes the storage gateway 5200. Reference sign N150 denotes the cache 1281 used by the storage gateway 5200 for data copy. Reference sign N160a denotes a shared upload volume implemented by the upload buffer 1282. Reference sign N160b denotes a shared upload volume implemented by the restore journal 160. Reference sign N170 denotes a remote copy volume 170 as the backup destination of the primary volume 130. Reference sign N180 denotes the snapshot 180 of the remote copy volume 170. Reference sign N155 denotes the master journal 155 used in the implementation of a universal replicator.

A dashed line denoted by reference sign V100 separates a data catalog view from an application view. A dashed line denoted by reference sign V200 separates the application view from a storage view. A dashed line denoted by reference sign V300 separates the storage view from a remote storage view. A dashed line denoted by reference sign V400 is a layer including a "shared upload volume" for all kinds of remote storage. A dashed line denoted by reference sign V400a denotes the upload buffer 1282. A dashed line denoted by reference sign V400b denotes the restore journal 160. Reference sign V500a denotes a direct backup relation between the secondary volume 140 and the remote copy volume 170. Reference sign V500b denotes a direct backup relation between the primary volume 130 and the remote copy volume 170.

Figure 15:
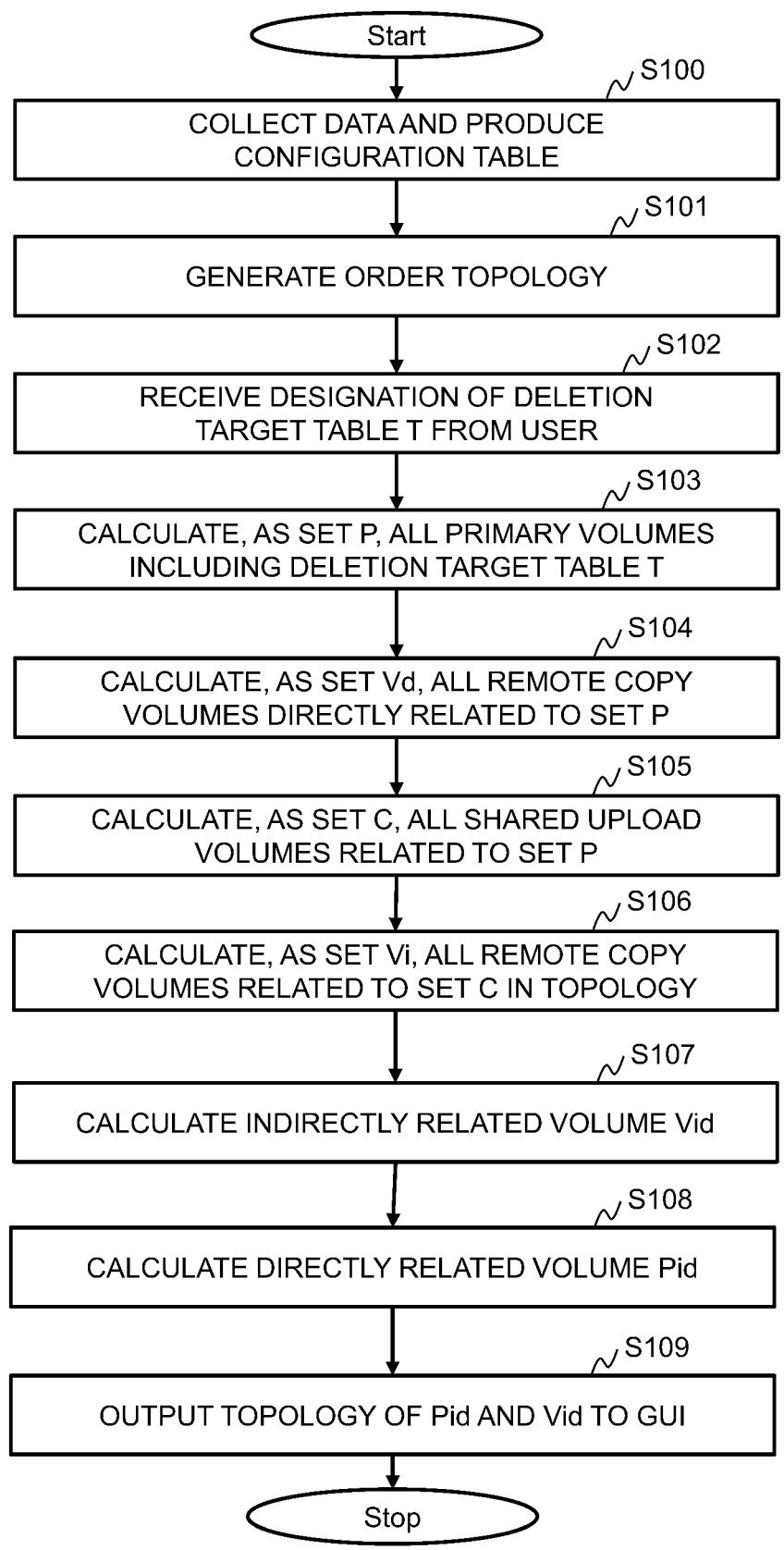
FIG. 15 is a flowchart illustrating a method of generating an impact amount relation.

FIG. 15 is a flowchart illustrating a method of generating the impact relation T1900, which is executed by the management system 8000. First at step S100, the topology specification program 8120 collects data from the data catalog 6000, the database server 2000, the storage system 4000, and the remote storage system 5000 by using the respective API interfaces and records the data as the configuration table 8121. Subsequently at step S101, the topology specification program 8120 generates order topology by using data of the configuration table 8121. The order topology is illustrated in FIG. 13 or 14. Subsequently at step S102, the impact specification program 8140 receives, from the user, a deletion target table T that is a table to be deleted. Subsequently at step S103, the impact specification program 8140 calculates, as a set P, all primary volumes including the deletion target table T in the topology. The set P is calculated by Expression 1 below.

$$P=\{x|x \in X \text{ AND } \forall y \in T, y<x \text{ AND } x \text{ is a primary volume}\} \quad (1)$$

In Expression 1, with "<", A<B indicates that A is at a higher level than B in the order relation of the order topology, in other words, on the upper side in FIGS. 13 and 14. Subsequently at step S104, the impact specification program 8140 calculates a set Vd of all remote copy volumes directly related to data stored in the set P or related to the set P through a secondary volume. The set Vd is calculated by Expression 2 below.

$$Vd=\{x|x \in X \text{ AND } \forall y \in P, y<x \text{ AND } x \text{ is a remote copy volume AND } y \text{ is related to } x \text{ directly or through a secondary volume}\} \quad (2)$$

Subsequently at step S105, the impact specification program 8140 calculates, as a set C, all shared upload volumes related to the set P in the topology. The set C is calculated by Expression 3 below.

$$C=\{x|x \in X \text{ AND } \forall y \in P, y<x \text{ AND } x \text{ is a shared upload volume}\} \quad (3)$$

Subsequently at step S106, the impact specification program 8140 specifies a set Vi of all remote copy volumes related to the set C in the topology. The set Vi is calculated by Expression 4 below.

$$Vi = \{x | x \in X \text{ AND } \forall y \in C, y < x \text{ AND } x \text{ is a remote copy volume}\} \quad (4)$$

Subsequently at step S107, the impact specification program 8140 subtracts the set Vd from the set Vi and specifies any indirectly related set Vid. In other words, processing at the present step calculates the set Vid as the complementary set of the set Vd in the set Vi. The set Vid is calculated by Expression 5 below.

$$Vid = Vi - Vd \quad (5)$$

Subsequently at step S108, the impact specification program 8140 calculates a set Pid of primary volumes one level higher than the set Vid. In other words, the set Pid is directly related to the set Vid, higher than the set Vid, and is a set of primary volumes. The set Pid is calculated by Expression 6 below.

$$Pid = \{x | x \in X \text{ AND } \forall y \in Vid, x < y \text{ AND } x \text{ is a primary volume AND } x \text{ is directly related to } y\} \quad (6)$$

In the expression, "x is directly related to y" means that they have a coupled relation in the topology. In the example illustrated in FIG. 14, a primary volume N130b and a shared upload volume N160b are not directly related to each other, and the primary volume N130b and a remote copy volume N170b are directly related to each other. Subsequently at step S109, the impact specification program 8140 outputs the calculated Pid and Vid as affected volumes to the GUI 9100 of the Web client 9000 and ends the processing illustrated in FIG. 15. In the following description, steps S103 and S104 are also referred to as a first specification step, steps S105 and S106 are also referred to as a second specification step, step S107 is also referred to as a third specification step, step S108 is also referred to as a fourth specification step, and step S109 is also referred to as a display step.

Figure 16:
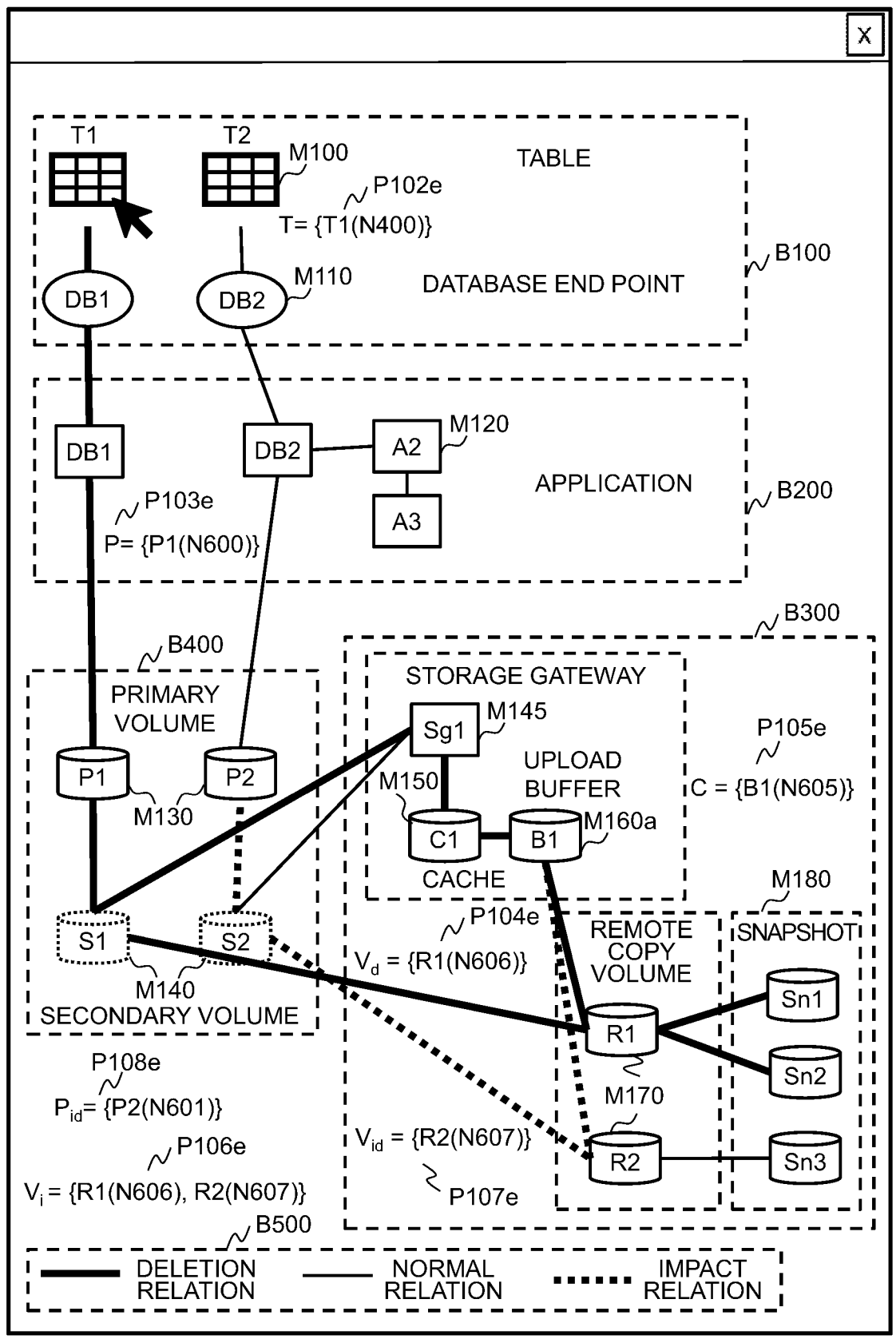
FIG. 16 is a diagram illustrating a GUI when a public cloud is used.
Figure 17:
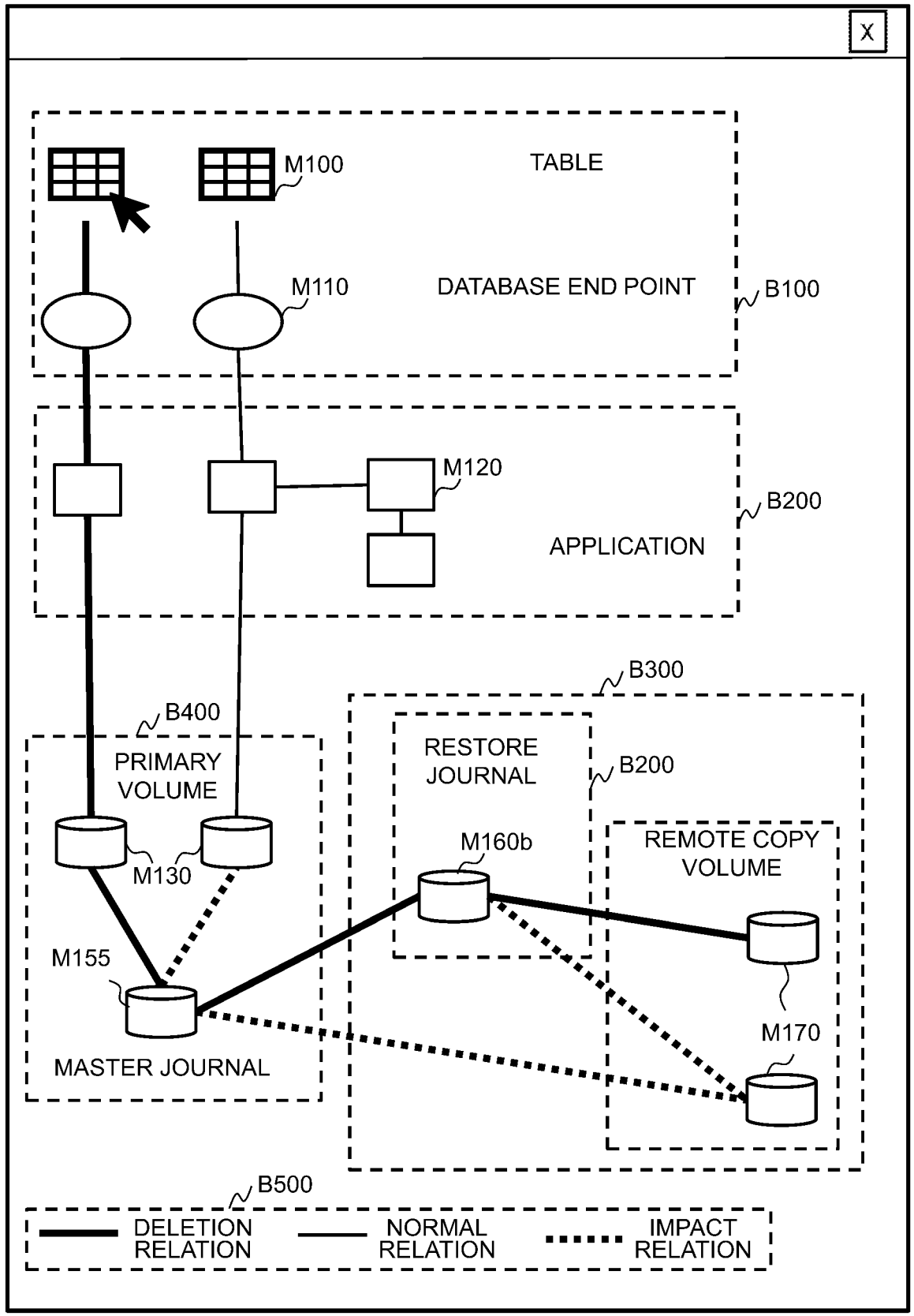
FIG. 17 is a diagram illustrating a GUI when a universal replicator is used.

FIGS. 16 and 17 are diagrams illustrating examples of the information output to the GUI 9100 at step S109 in FIG. 15. FIG. 16 illustrates the GUI when a public cloud is used, and FIG. 17 illustrates the GUI when a universal replicator is used. FIG. 16 also includes information to be used in later description of a specific example. Reference sign M100 denotes an icon visualizing a table 100 of the data catalog 6000. Reference sign M110 denotes an icon visualizing the database end point of the data catalog 6000. Reference sign M120 denotes an icon visualizing the application that processes the database 2311. Reference sign M130 denotes an icon visualizing a primary volume 130.

Reference sign M140 denotes an icon visualizing a secondary volume. Reference sign M145 denotes an icon visualizing the storage gateway 5200. Reference sign M150 denotes an icon visualizing the cache 1281 coupled to the storage gateway 5200. Reference sign M160a denotes an icon visualizing the upload buffer 1282 coupled to the storage gateway 5200 used as a shared upload volume. Reference sign M170 denotes an icon visualizing a remote copy volume 170 to which the primary volume 130 is backed up. Reference sign M180 denotes an icon visualizing the snapshot 180 of the remote copy volume 170.

Reference sign M155 denotes an icon visualizing the master journal 155. Reference sign M160b denotes an icon visualizing the restore journal 160 used as a shared upload volume. Reference sign B100 denotes the data catalog view. Reference sign B200 denotes the application view. Reference sign B300 denotes the remote storage view. Reference sign B400 denotes the storage view. Reference sign B500 denotes legends in the diagram. Each line represents a data flow relation, each bold line represents a data deletion relation, and each dashed line represents a deletion impact relation.

Specific Example

The operation of the flowchart described above with reference to FIG. 15 will be described below with reference to FIGS. 7, 8, 16, and 18. This specific example assumes the topology object T1100 as illustrated in FIG. 7 and the topology link T1200 as illustrated in FIG. 8.

Figure 18:
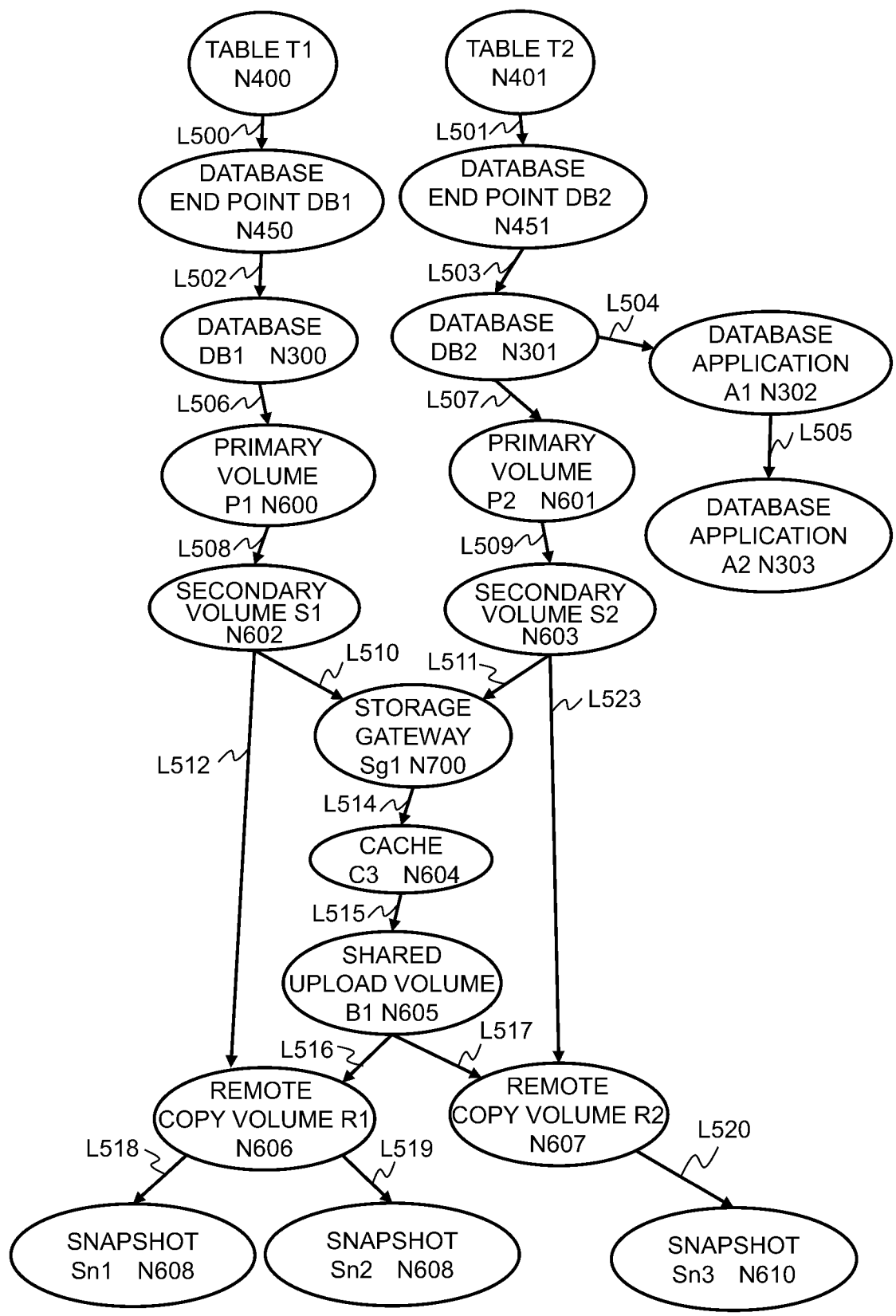
FIG. 18 is a diagram illustrating a specific example of a topology graph.

FIG. 18 is a diagram illustrating a specific example of a topology graph. Specifically, FIG. 18 is a topology graph corresponding to the topology object T1100 illustrated in FIG. 7 and the topology link T1200 illustrated in FIG. 8 when a public cloud is used as a remote storage environment. In FIG. 18, a type, a name, and a node ID are illustrated for each node, and a link ID is attached to each arrow coupling nodes. FIG. 16 is GUI display corresponding to the topology graph illustrated in FIG. 18, and only a name is illustrated for each node.

At step S101, the topology graph illustrated in FIG. 18 is generated. Subsequently at step S102, a table T1 is designated by the user. In FIG. 16, the designation is denoted by reference sign P102e, and the deletion target table T is written as T1 of node N400. Subsequently at step S103, links L500, L502, and L506 are traced and the set P of all primary volumes including the deletion target table T is specified as a primary volume P1. In FIG. 16, the result of processing at the present step is denoted by reference sign P103e and indicated such that the set P is constituted only by P1 of node N600.

Subsequently at step S104, links L508 and L512 are traced and a remote copy volume R1 of node N606 is set to the set Vd of all remote copy volumes directly related to the set P. In FIG. 16, the result of processing at the present step is denoted by reference sign P104e and indicated such that the set Vd is constituted only by R1 of node N606. Subsequently at step S105, links L508, L510, L514, and L515 are traced and an upload buffer B1 of node N605 is set to the set C of all shared upload volumes related to the set P in the topology. In FIG. 16, the result of processing at the present step is denoted by reference sign P105e and indicated such that the set C is constituted only by B1 of node N605.

Subsequently at step S106, links L516 and L517 are traced and the remote copy volume R1 of node N606 and a remote copy volume R2 of node N607 are set to the set Vi of all remote copy volumes related to the set C in the topology. In FIG. 16, the result of processing at the present step is denoted by reference sign P106e and indicated such that the set Vi is constituted by R1 of node N606 and R2 of node N607. Subsequently at step S107, the set Vd is subtracted from the set Vi, and the indirectly related set Vid is set to the remote copy volume R2 of node N607. In FIG. 16, the result of processing at the present step is denoted by reference sign P107e and indicated such that the set Vid is constituted only by R2 of node N607.

Subsequently at step S108, links L523 and L509 are traced and the set Pid of primary volumes one level higher than the set Vid or one level higher than a secondary volume one level higher than the set Vid is set to a primary volume P2 of node N601. In FIG. 16, the result of processing at the present step is denoted by reference sign P108e and indicated such that the set Pid is constituted only by P2 of node N601.

According to the first embodiment described above, effects below are obtained.

(1) The management method executed by the management system 8000 that is a computer and configured to manage the relation among the primary volumes 130, the remote copy volumes 170, and the restore journal 160 and the upload buffer 1282 as shared upload volumes includes processing below. The processing executed by the management system 8000 includes a topology specification step that is the processing at step S100 in FIG. 15, executed by the topology specification program 8120, and accesses the API interfaces 10A and collects data related to the primary volumes 130, the remote copy volumes 170, and the shared upload volumes. The processing executed by the management system 8000 includes a topology generation step that is the processing at step S101 in FIG. 15, executed by the topology specification program 8120, and generates order topology related to the primary volumes 130, the remote copy volumes 170, and the shared upload volumes. The processing executed by the management system 8000 includes the first specification step that is the processing at steps S103 and S104 in FIG. 15, executed by the impact specification program 8140, and calculates the set P of primary volumes storing data to be deleted and specifies the set Vd of remote copy volumes directly related to the set P in the order topology. The processing executed by the management system 8000 includes the second specification step that is the processing at steps S105 and S106 in FIG. 15, executed by the impact specification program 8140, and calculates, as the set C, all shared upload volumes related to the set P in the order topology and specifies the set Vi of all remote copy volumes related to the set C in the order topology. The processing executed by the management system 8000 includes the third specification step calculates the set Vid as the complementary set of the set Vd in the set Vi and the fourth specification step of specifying the set Pid of primary volumes one level higher than the set Vid in the order topology, the specification steps being the processing at steps S107 and S108 in FIG. 15 and executed by the impact specification program 8140. Thus, impact of data deletion can be specified in advance.

(2) The management method executed by the management system 8000 includes an input reception step of acquiring, from the user, information that specifies data to be deleted, and the display step of performing GUI display of the set Vid calculated in the third specification step and the set Pid calculated in the fourth specification step. Thus, GUI display as illustrated in FIGS. 14 and 15 can be provided to the user.

Modification 1

In the first embodiment described above, the impact specification program 8140 starts processing after having received, from the Web client 9000, a table to be deleted. However, the impact specification program 8140 may perform processing without receiving a table to be deleted from the Web client 9000. In this case, the impact specification program 8140 may randomly select a table to be deleted or may sequentially select, as a processing target, each table listed in the configuration table 8121. According to Modification 1, since the impact specification program 8140 performs calculation in advance, it is possible to shorten a waiting time period after the user selects a table to be deleted and before a calculation result is displayed on the GUI.

In the above-described embodiment and modification, the configuration of functional blocks is merely exemplary. Some functional components described as separate functional blocks may be integrated, or a configuration illustrated in one functional block diagram may be divided into two or more functions. Part of the function of any functional block may be implemented by another functional block.

In the above-described embodiment and modification, the computer program of the management system 8000 is stored in a non-illustrated ROM, but the computer program may be stored in the storage unit 8500. Alternatively, the management system 8000 may include a non-illustrated input-output interface, and the computer program may be read from another apparatus through a medium compatible with the input-output interface and the management system 8000 as necessary. The medium is, for example, a storage medium detachable to the input-output interface, a communication medium, in other words, a network such as a wired network, a wireless network, or an optical network, or a carrier wave or digital signal propagating through the network. Some or all functions implemented by the computer program may be implemented by a hardware circuit or FPGA.

The above-described embodiment and modification may be combined. Although various kinds of embodiments and modifications are described above, the present invention is not limited to the contents thereof. Any other aspect thought of in the range of the technical idea of the present invention is included in the range of the present invention.

What is claimed is:

1. A management method executed by a computer to manage a relation among primary volumes, remote copy volumes, and shared upload volumes, the management method comprising:
    a topology specification step of accessing API interfaces and collecting data related to the primary volumes, the remote copy volumes, and the shared upload volumes;
    a topology generation step of generating order topology related to the primary volumes, the remote copy volumes, and the shared upload volumes;
    a first specification step of calculating a set P of the primary volumes storing data to be deleted and specifying a set Vd of the remote copy volumes directly related to the set P in the order topology;
    a second specification step of calculating, as a set C, all of the shared upload volumes related to the set P in the order topology and specifying a set Vi of all of the remote copy volumes related to the set C in the order topology;
    a third specification step of calculating a set Vid as the complementary set of the set Vd in the set Vi; and
    a fourth specification step of specifying a set Pid of the primary volumes one level higher than the set Vid in the order topology.

2. The management method according to claim 1, further comprising:
    an input reception step of acquiring, from a user, information that specifies the data to be deleted; and
    a display step of performing GUI display of the set Vid calculated in the third specification step and the set Pid calculated in the fourth specification step.

3. The management method according to claim 1, wherein the remote copy volumes and the shared upload volumes are disposed on a public cloud,
    the primary volumes are each copied to a virtual secondary volume and then are directly copied to the remote copy volumes or copied to the remote copy volumes through the shared upload volumes,
    the set Vd specified in the first specification step further includes the remote copy volumes coupled to the set P through the secondary volume, and the set Pid specified in the fourth specification step further includes the primary volumes one level higher than the secondary volume one level higher than the set Vid.

\* \* \* \* \*